Figure 2:
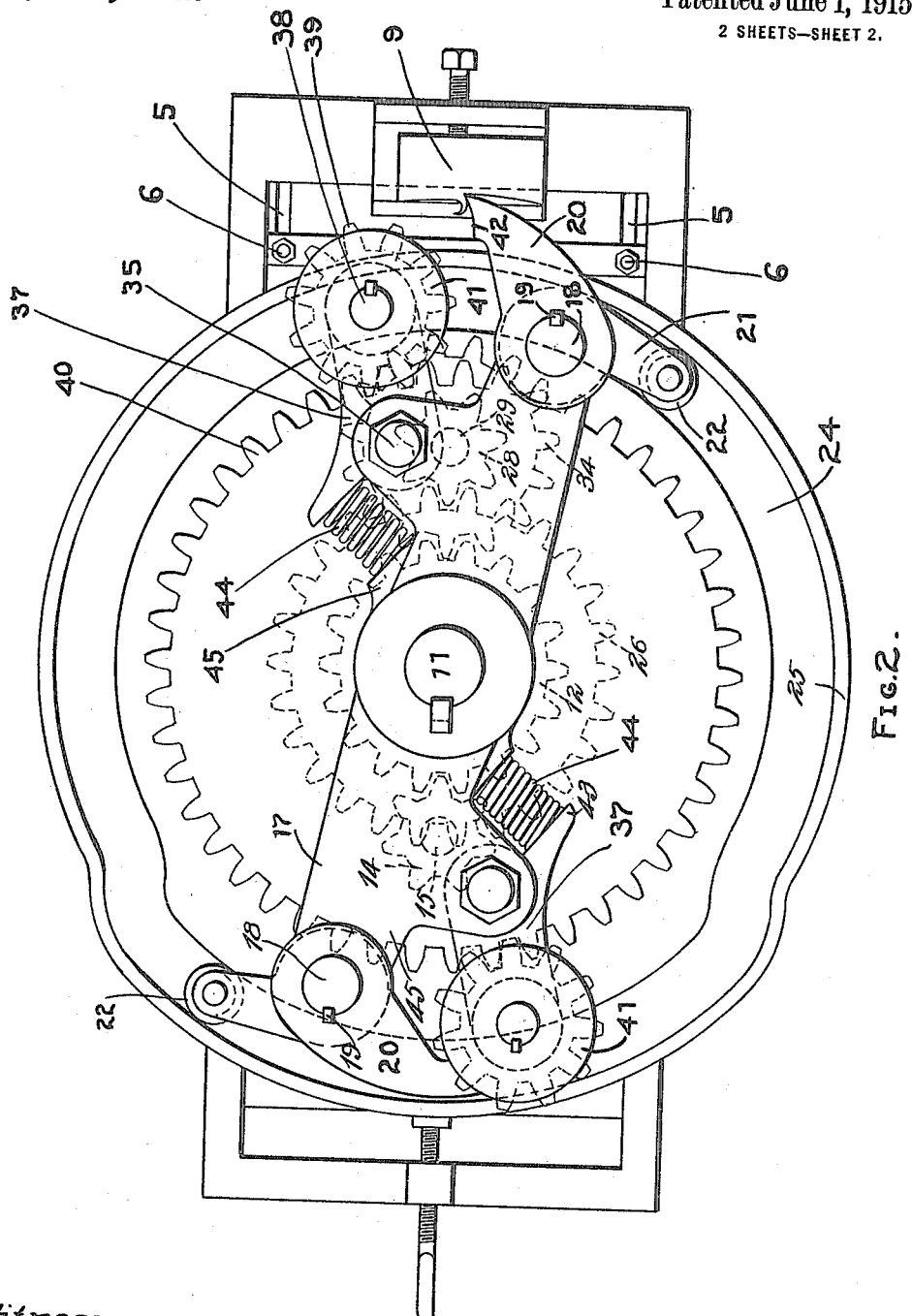

E. C. MORGAN.
CUTTING MECHANISM.
APPLICATION FILED JUNE 27, 1910.
1,141,254.
Patented June 1, 1915.
2 SHEETS—SHEET 1.
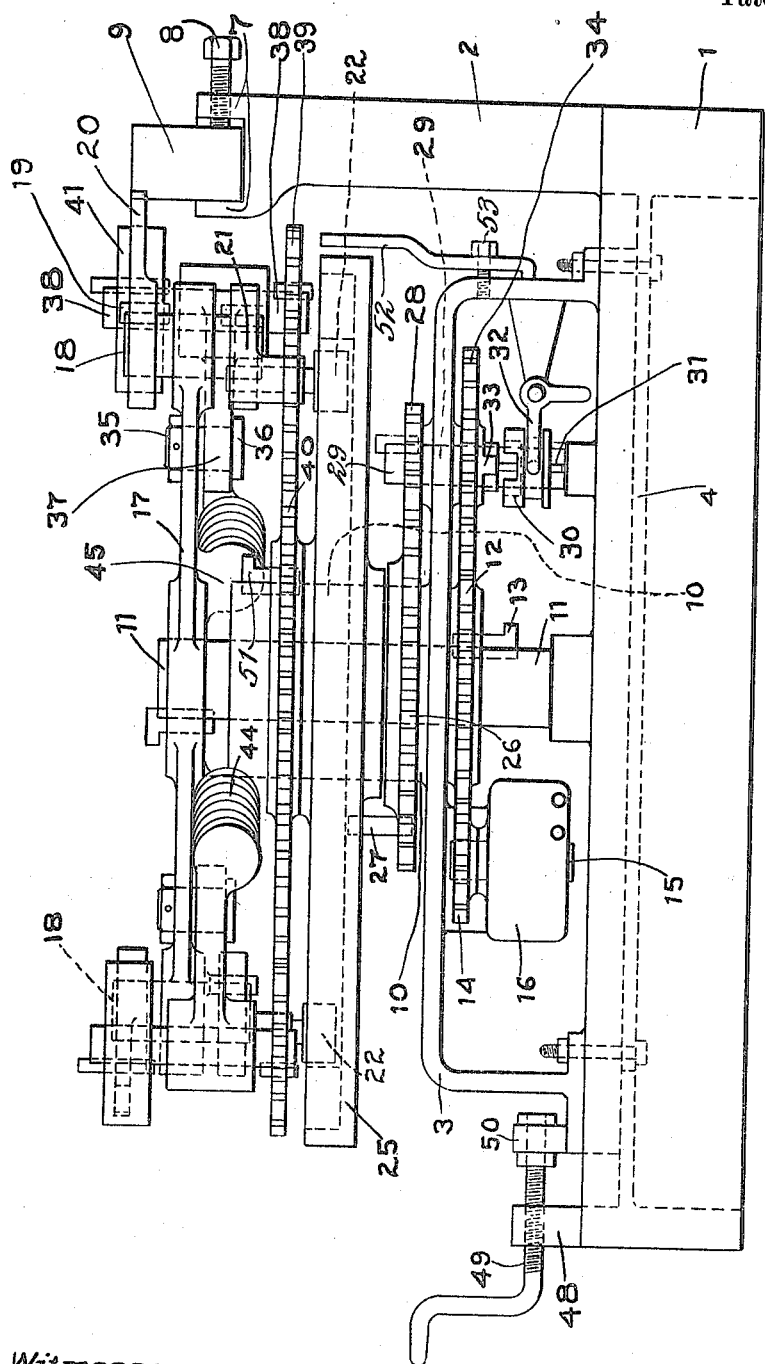
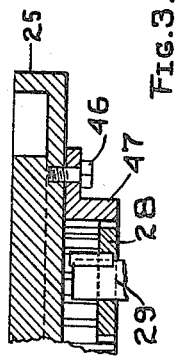
Witnesses:
Inventor:
Edmund C. Morgan.
By Brown & Hopkins
Attorneys

UNITED STATES PATENT OFFICE.

EDMUND C. MORGAN, OF MORGAN PARK, ILLINOIS.

CUTTING MECHANISM.

1,141,254.  Specification of Letters Patent.  Patented June 1, 1915.

Application filed June 27, 1910. Serial No. 569,172.

*To all whom it may concern:*

Be it known that I, EDMUND C. MORGAN, a citizen of the United States, residing at Morgan Park, in the county of Cook and State of Illinois, have invented certain new and useful Improvements in Cutting Mechanisms, of which the following is a specification.

My invention relates to cutting mechanism and is particularly adapted for cutting metal, wood, or any other materials, but may have a general application including application to mining machinery.

One of the objects of the present invention is to increase the efficiency of such cutting mechanism by providing means traveling with the cutter for automatically sharpening the cutting tools at intervals without stopping the motion of the cutters or removing them from their holders.

The present invention also includes cutter-sharpening means automatically operated by the cutting mechanism, for sharpening the cutters, but this broad subject-matter is covered in my co-pending application, Serial No. 569,171, filed June 27, 1910, for improvement in cutting mechanism.

More particularly, it is the object of the present invention to provide grinding mechanism for each cutter of a series of cutters, mounted on radial arms and traveling therewith, the grinding mechanism being resiliently mounted and automatically operated by cam mechanism and gearing without stopping the operation of the cutter.

Other objects of the invention will appear hereinafter, the novel combination of elements and the novel features of the invention being set forth in the appended claims.

In the accompanying drawings,—Figure 1 is a side elevation of a machine constructed in accordance with the principles of the present invention; Fig. 2 is a plan view of Fig. 1; and Fig. 3 is a fragmentary view of a modification.

Similar reference numerals refer to similar parts throughout the various views, in which 1 represents the base of the machine. Connected to one end of the base 1 is a vertical standard 2. Slidably mounted on the base 1 is a cutter-supporting carriage 3. The base 1 may be made of any suitable form but, as shown in Fig. 2, is preferably rectangular in shape and provided with a guideway 4, on which the carriage 3 is adapted to slide, said guideway 4 being provided with slots 5 through which bolts 6 may pass to maintain the carriage 3 securely in adjusted position on the base 1. Upon the upper end of the standard 2 is a work holder, comprising jaws 7 and a set screw 8 threaded in one of said jaws and adapted to clamp the piece of material 9 between the jaws while being operated upon by the cutting mechanism. Where the cutting mechanism is used in mining operations, it is obvious that the standard 2 and the work holder may be omitted, and the length of the cutters 20 made of any length desired, according to the depth of cut to be made in the mine wall, the other parts being proportioned accordingly.

The carriage 3 is provided with a vertical hub or cylindrical bearing 10, which projects upwardly, as shown in Fig. 1, and is integral with the frame 3 or secured rigidly thereto.

Extending vertically through the center of the cylindrical bearing 10 is a shaft 11 having its lower end mounted in a suitable bearing on the base 1.

Keyed to the lower portion of the vertical shaft 11 is a gear 12, the key being indicated at 13.

Suspended from a portion of the frame 3 is an electric motor 16, the shaft 15 of which is provided with a pinion 14, which is in mesh with the gear 12.

Also mounted in a suitable bearing on the base 1 is an auxiliary vertical shaft 29 extending through a portion of the frame 3 to the right of the vertical shaft 11. Mounted loosely on this vertical shaft 29 is a gear 34, which meshes with the gear 12 on the shaft 11.

Upon the lower portion of the auxiliary vertical shaft 29 is a clutch member 30, which is slidable along the shaft 29 but forced to rotate therewith by a feather 31. This clutch 30 may be moved by a lever 32 into and out of engagement with a clutch element 33 rigidly connected upon the lower side of the gear 34.

At the upper end of the shaft 29 is keyed a gear 28, which meshes with a larger gear 26 mounted loosely on the lower portion of the cylindrical bearing 10. The gear 26 is freely rotatable about the cylindrical bearing 10 and is provided with a vertically projecting pin 27 engaging a suitable recess (not shown) in the lower surface of a cam disk 25. This cam disk rests on top of the hub portion of the gear 26 and is free to rotate on the intermediate portion of the cylindrical bearing 10. It is therefore evident that when the electric motor 16 is operated, rotary motion will be transmitted to the vertical shaft 11 and to the gear 34 which is mounted loosely on the auxiliary shaft 29. When the lever 32 is operated to engage the clutch members 30 and 33, motion will also be transmitted to the shaft 29 and the gears 28 and 26, and, by reason of the pin 27 engaging the cam disk 25, the latter will also be rotated. The extent of rotation of the cam disk 25 and its position may, therefore, be controlled by operating the clutch comprising the members 30 and 33.

Keyed to the upper end of the shaft 11 are a plurality of radial cutter bars 17, each of which is provided at its outer end with vertical oscillatable short shafts 18. Rigidly secured to each of the vertical shafts 18, by means of a key 19, is a cutter 20. These cutters are mounted on the upper ends of the short vertical shafts 18, 18. Keyed to the lower end of each of the vertical shafts 18 below the cutter bar 17 is a cam lever 21, upon the rear end of which is mounted an anti-friction roller 22 which is suitably disposed to travel in a cam groove 24 formed in the cam disk 25.

Projecting laterally from an intermediate portion of each of the cutter bars 17 is a bracket which carries a vertical pivot bolt 35. The lower end of the pivot bolt 35 is provided with an enlarged head portion 36, as shown in Fig. 1, for the purpose of pivotally supporting the lever 37 so that the latter may oscillate freely.

The outer end of the lever 37 is provided with a short vertical shaft 38, to the lower end of which is keyed a gear 39, which meshes with a large gear 40. This gear 40 is rigidly secured to the upper portion of the cylindrical support 10, as indicated by the cam 51 in Fig. 1.

Upon the upper end of each of the short vertical shafts 38 is rigidly secured, preferably by means of a key, the grinding wheel 41, which is adapted to be brought into grinding engagement with the cutting face 42 of each cutter 20 at certain intervals during the operation of the rotary cutting mechanism. Whenever the motor 16 is operated and motion is transmitted to the shaft 11, the bars 17 will be rotated, and so also the levers 37. The gear 40 being held stationary, the grinding wheels 41 will be rotated because of the rotation of the small gears 39 meshing with the large gear 40. When the cutter bars 17 are rotated, the rollers 22 are confined in the cam groove 24. This cam groove is equidistant from the shaft 11 over that portion adjacent the material being operated on, as shown in Fig. 2, but at the rear quarter it jogs into a cam groove more distant from the shaft 11, so that, during each revolution of an arm 17, its lever 37 will be oscillated about its pivot by reason of the roller 22 entering the cam portion of the groove 24. In this manner, each cutter 20 is swung toward the grinding wheel 41 adjacent the same, while the grinding wheel is being rotated by the gears 39 and 40 and while the rotation of the cutter bars 17 continues.

In order to provide means for resiliently pressing the grinding wheel 41 against the cutting face of the cutter during the grinding operation, while at the same time making allowance for the reduction in the size of the cutter due to grinding, the oscillatable supporting lever 37 is provided with a projection 43, against which abuts one end of a resilient device, preferably a spiral spring 44, the other end of said spring being in abutment with a boss 45 on the inner portion of the cutter bar 17. When the several parts are in the relative positions shown in Fig. 2, the right hand cutter 20 is in position to engage the material 9 which is to be operated upon, while the left hand cutter 20 is oscillated about the axis of the shaft 18 into grinding engagement with the left hand grinding wheel 41, by reason of the left hand cam roller 22 having reached that portion of the groove 24 in the cam disk 25 which is farthest from the center of the shaft. The presence of the spring 44 always insures good contact between the grinding wheel and the cutter 20, even after the latter has been considerably worn away at its point.

As shown in Fig. 1, at the right hand end of the frame 3 is mounted a vertical bar 52, which may be adjustably connected to the frame 3 by means of a clamp bolt 53. The purpose of this bar 52 is to prevent the cam disk 25 from rotating when the machine is used under certain conditions. By tightening up the bolt 53, the bar 52 may be forced against the periphery of the cam disk 25 to hold the same in adjusted position. Then the sharpening device for each cutter will operate automatically at regular intervals, and each sharpening device will be operated automatically by the rotation of the cutting mechanism once during each rotation thereof. It is also obvious that if desired the bar 52 may act as a stop coöperating with the cam disk 25 at the points where the arcuate groove extends into the groove of larger radius. However, if desired, the bar 52 may be omitted and the friction of the gearing and of the cam disk on its bearings may be relied upon to hold the cam disk 25 in adjusted position. Such arrangement would not interfere with the continuous rotation of the cam disk 25 when that is desired, by throwing in the clutch 30, 33, because then power would be supplied from the electric motor 16 to rotate the disk 25. When the clutch 30, 33, is thrown in during the operation of the rotary cutting mechanism, the cam disk 25 will be rotated in the same direction as the cutter bar 17, but at a slower rate of speed because of the reduction gearing 28, 26.

In order to provide means for varying the intervals of the grinding operations, the gears 26 and 28 may be replaced by other gears of different diameters than those represented, to vary the movement of the cam disk 25, for which purpose driving pins similar to the pin 27 for engaging the cam disk 25 may be mounted in suitable positions on such adjustable gearing.

In Fig. 3, I have shown a modification of the gearing for transmitting motion to the disk 25, which may be substituted for the pin 27 if desired. The cam disk 25 may then have secured to the bottom thereof, in any suitable manner, preferably by means of bolts 46, an annular gear 47 in driven engagement with the gear 28. In employing this modification, an intermediate gear may be placed between the gears 12 and 34 so as to secure a rotation of the disk 25 in the same direction as the direction of rotation of the cutter bar 17.

It will be evident that when the clutch 30, 33 is thrown in to produce the rotation of the cam disk 25 at a slower rate of speed than the rotation of the cutting mechanism, the cam groove of larger radius will follow behind the cutter arms. This will cause the grinding operation of each cutter to be prolonged, so that the cutter will be thoroughly sharpened before it is released and permitted to perform the cutting operation. Furthermore, each cutting tool will then make a series of cuts successively before being sharpened. However, as before stated, the clutch 30, 33 may be left disengaged and the cam groove of larger radius relied upon to operate the grinding mechanism once during each rotation of each cutter. In order to vary the amount of grinding, the cam groove of larger radius may be made longer, if desired.

Mounted within a threaded lug 48 at the rear end of the base 1 of the machine is a feed screw 49, which pivotally engages a bearing lug 50 at the rear end of the carriage 3, so that when the screw 49 is turned by means of the crank shown, the carriage 3 is caused to approach or recede from the work-supporting standard 2.

Obviously those skilled in the art may make various changes in the details and arrangement of parts without departing from the spirit and scope of my invention as defined by the claims hereto appended, and I wish therefore not to be restricted to the precise construction herein disclosed.

What I claim is:

1. In automatic apparatus for sharpening cutting mechanism, the combination with a plurality of cutters and means for rotating the same continuously in a horizontal plane, of a grinding device associated with each cutter, and means for automatically operating the cutters for sharpening each cutter at intervals.

2. In a cutting mechanism, the combination with a continuously operated cutter, of a sharpening means therefor traveling with the cutter, and means for automatically moving said cutter into and out of sharpening relation with respect to the sharpening means while the cutter is in motion.

3. In a cutting mechanism, the combination of a traveling cutter, means traveling with the cutter for sharpening said cutter, and means for operably connecting said sharpening means with said cutter.

4. In a cutting mechanism, the combination with a continuously moving cutter, of means for supporting said cutter, a cutter sharpening means carried by said cutter-supporting means and traveling with the cutter, and means for moving said cutter into and out of sharpening relation with the sharpening means.

5. In a cutting mechanism, the combination with a continuously moving cutter, of means for supporting said cutter, a cutter sharpening means carried by said cutter-supporting means and traveling with the cutter, and means for moving said cutter into and out of sharpening relation with the sharpening means, said means being operated by the operation of the machine.

6. In a cutting mechanism, the combination with a frame provided with work-holding means, of a cutter movably mounted on said frame, grinding means also movably mounted on said frame and traveling with the cutter, means for driving the cutting mechanism, and means operatably related to said driving means for moving the cutter into and out of grinding relation with the grinding means, said grinder moving means being operative intermittently.

7. In a device of the character described, the combination of a work-holder, a cutter carriage movable toward and away from said work-holder, a rotary shaft mounted on said carriage, a cutter operated by said shaft, and means traveling with the cutter for grinding the same.

8. In a device of the character described, the combination with a work-holder, of a carriage movable toward and away from said work-holder, a rotary shaft mounted on said carriage, a cutter operated by said shaft, means traveling with the cutter for grinding the same, and means for moving the cutter into and out of grinding engagement with the cutter-grinding means, said grinder moving means being arranged and adapted to effect the grinding operation at regularly recurring intervals.

9. In a device of the character described, the combination with a work-holder, of a carriage movable relatively thereto, a shaft rotatably mounted on said carriage, a cutter carried by said shaft, means traveling with the cutter for grinding the same, and automatically operated means for moving the cutter into and out of grinding engagement with the cutter-grinding means and adapted to effect the grinding operation at regularly recurring intervals.

10. In a device of the character described, the combination with a work-holder, of a carriage movable relatively thereto, a cutter bar carried by said shaft, cutters mounted on said cutter bar, said cutters being movable about an axis, a grinding wheel rotatably mounted on said cutter bar, and means for oscillating said cutters on their axes into and out of engagement with the grinding wheel.

11. In a device for the purpose described, the combination with a work-holder and a carriage movable relatively thereto, of a rotary shaft mounted on said carriage, a cutter bar secured to said shaft, a cutter oscillatably mounted upon said cutter bar, a grinding wheel swingingly mounted on said cutter bar, resilient means for resisting the swinging movement of the grinding wheel, means for oscillating the cutter into and out of grinding relation with the grinding wheel, and means for rotating the grinding wheel.

12. In a device for the purpose described, the combination with a work-holding means, of a carriage movable relatively thereto, a rotary shaft mounted on said carriage, a cutter bar keyed to said shaft intermittently of its ends, a pair of cutters pivotally mounted on the outer ends of said cutter bar, a cam rotatably mounted coaxially with the shaft and movable relatively thereto, a cam movement operated by said cam and operably connected to each of said cutters, a stationary gear coaxially mounted with the shaft, and a grinding wheel rotatably mounted on said cutter bar and geared to said stationary gear, said cutter being movable into and out of engagement with said grinding wheel by said cam movement.

13. In a device for the purpose described, the combination with a work-holder, and a carriage movable relatively thereto, of a rotary shaft mounted on said carriage, a stationary gear co-axially mounted with said shaft, a cam disk coaxial with said shaft, a cutter bar keyed to said shaft, a cutter oscillatably mounted on said cutter bar, a grinding wheel carried by said cutter bar and geared to said stationary gear so as to be rotated when the cutter bar is rotated, a cam movement operatably related to the cam disk and operably connected with the cutter for moving it into and out of engagement with the grinding wheel, and means for operating said cam disk relatively to said shaft, said means being adapted to be operated continuously or intermittently.

14. In a cutter mechanism, the combination of a traveling cutter, yieldingly supported means traveling with the cutter for sharpening the cutter, and means for operably connecting said sharpening means with said cutter.

15. In a cutting mechanism, the combination of a traveling cutter, yieldingly supported means traveling with the cutter for sharpening the cutter, and means for operably connecting said sharpening means with said cutter automatically.

16. In a cutting mechanism, the combination of a traveling cutter, yieldingly supported means traveling with the cutter for sharpening said cutter, and means for operably connecting said sharpening means with said cutter at predetermined intervals.

17. In a cutting mechanism, the combination of a traveling cutter, means traveling with the cutter for sharpening said cutter, means for operably connecting said sharpening means with said cutter, and means operated by the cutting mechanism for operating the sharpening means.

18. In a cutting mechanism, the combination of a traveling cutter, means traveling with the cutter for sharpening said cutter, means for operably connecting said sharpening means with said cutter automatically, and means operated by the cutting mechanism for operating the sharpening means.

19. In a cutting mechanism, the combination of a rotary cutter movable toward and away from the work, means for rotating the cutter, and means traveling with the cutter for sharpening the same.

20. In a cutting mechanism, the combination of a rotary cutter movable toward and away from the work, means for rotating the cutter, means traveling with the cutter for sharpening the same, and means for establishing operative relation between the cutter and the sharpening means.

21. In a cutting mechanism, the combination of a rotary cutter movable toward and away from the work, means traveling with the cutter for sharpening the same, and means for automatically establishing operative relation between the cutter and the sharpening means.

22. In a cutting mechanism, the combination of a rotary cutter movable toward and away from the work, means for rotating the cutter, and yieldingly supported means traveling with the cutter for sharpening the same.

23. In a cutting mechanism, the combination of a rotary cutter movable toward and away from the work, means for rotating the cutter, yieldingly supported means traveling with the cutter for sharpening the cutter, and means for establishing operative relation between the cutter and the sharpening means.

24. In a cutting mechanism, the combination of a rotary cutter movable toward and away from the work, means for rotating the cutter, yieldingly supported means traveling with the cutter for sharpening the cutter, and positive means for establishing operative relation between the cutter and sharpening means.

25. In a cutting mechanism, the combination of a rotary cutter movable toward and away from the work, means for rotating the cutter, yieldingly supported means traveling with the cutter for sharpening the cutter, and positive means controlled by the movement of the cutter for establishing operative relation between the cutter and the sharpening means.

26. The combination with cutting mechanism comprising a plurality of cutters, of a plurality of cutter-sharpening devices one associated with each cutter, and means for automatically effecting the sharpening of said cutters.

27. The combination with cutting mechanism comprising a moving arm and a cutter pivoted thereto, of a cutter-sharpener pivotally connected to said arm, and means for moving said cutter into position to be operated upon by said cutter sharpener.

28. The combination with cutting mechanism comprising a moving arm carrying a cutter, of a cutter-sharpener mounted on said arm and moving therewith, and means for bringing said cutter and said sharpener into engagement at intervals.

29. The combination with cutting mechanism comprising a moving arm and a cutter carried thereby, of a cutter-sharpener carried by said arm and moving therewith, and means for automatically bringing said cutter into engagement with said cutter-sharpener at intervals.

30. The combination with cutting mechanism comprising a pivotally mounted cutter, of cutter-sharpening means associated with said cutter during its entire operation, and means for effecting the operation of said cutter-sharpening means on said cutter while the latter is in motion.

31. In a cutting mechanism, the combination with a continuously operating cutter, of means traveling with the cutter for sharpening the latter, said means being operatively related to the cutter while the latter is in motion.

32. The combination of cutting apparatus comprising a plurality of cutters, and a sharpening device associated with each cutter for automatically sharpening the same at intervals.

33. The combination with a cutter, of a support therefor, sharpening means carried by said cutter support and moving therewith, and mechanism for moving said cutter into and out of sharpening relation with said sharpening means.

34. The combination with cutting apparatus comprising a plurality of cutters, of sharpening devices one associated with each cutter, and means for operating such sharpening devices while the cutting apparatus is in operation.

35. The combination with cutting apparatus comprising a plurality of cutters, of a grinding device associated with each cutter, and means for automatically effecting the sharpening of said cutters successively.

36. The combination with a frame, of a cutter movably mounted thereon, grinding mechanism traveling with said cutter, means for driving said cutter, and apparatus operatively related to said driving means for moving the cutter intermittently into and out of grinding relation with said grinding mechanism.

37. The combination with a stationary supporting frame, of cutting apparatus mounted thereon and comprising a cutter and an arm for carrying the cutter, a grinding device swingingly mounted on said arm and movable therewith, and means for moving said cutter into and out of engagement with said grinding device.

38. The combination with a carriage, of a rotary shaft mounted on said carriage, a cutter mounted on said shaft, means for operating said shaft to rotate said cutter, and means mounted on and traveling with said cutter for sharpening the same.

39. The combination with a carriage, of a rotary shaft mounted on said carriage, a cutter mounted on said shaft, means mounted on and traveling with the cutter for grinding the same, and apparatus for moving said cutter into and out of grinding engagement with the cutter-grinding means at regularly recurring intervals.

40. The combination with cutting apparatus comprising a cutter and a support therefor, of a grinding device pivoted to said support, mechanism for effecting the operation of said grinding device automatically at regularly recurring intervals, and resilient means for holding the grinding device against the cutter during the grinding operation.

41. The combination with cutting apparatus comprising a rotary cutting bar and a cutter mounted thereon, of an arm mounted on said cutter bar, a grinding wheel pivoted to said arm, a gear connected to said grinding wheel, a fixed gear meshing with said first-named gear, means for rotating the cutter bar to move the cutter and at the same time effect the rotation of said grinding wheel, and apparatus for establishing grinding relation between said cutter and said grinding wheel.

42. The combination with a rotary shaft, of a radial cutter bar mounted thereon, a cutter mounted on said cutter bar, a grinding wheel, a small gear connected to said grinding wheel to rotate therewith, a large fixed gear concentric with said shaft and meshing with said small gear, and cam mechanism for automatically moving said cutter into engagement with said grinding wheel at intervals.

43. The combination with cutting apparatus, of sharpening mechanism therefor and traveling therewith, and a cam for automatically effecting the sharpening of said cutting apparatus.

44. The combination with cutting apparatus, of sharpening mechanism therefor, a cam for effecting an operative relation between the cutter and said sharpening mechanism, means for holding said cam stationary and means for adjusting the position of said cam.

45. The combination with cutting apparatus comprising a cutter, of sharpening mechanism therefor and traveling therewith, and a rotary cam for effecting an operative relation between said cutter and said sharpening mechanism at intervals.

46. The combination with cutting apparatus comprising a cutter, of sharpening mechanism therefor, a movable cam for effecting an operative relation between said cutter and said sharpening mechanism, and means for holding said cam in a predetermined position during the operation of said cutting apparatus and said sharpening mechanism.

47. The combination with cutting apparatus comprising a cutter, of sharpening mechanism therefor and traveling therewith, a cam for bringing the cutter and the sharpening mechanism into coöperative relation, and gearing for effecting the movement of said cam.

48. The combination with cutting apparatus comprising a cutter, of sharpening mechanism therefor, a rotary cam for bringing said cutter and said sharpening mechanism into operative relation, and means for rotating said cam at will.

49. The combination with cutting apparatus comprising a cutter, of sharpening mechanism for said cutter, movable cam mechanism for establishing operative relation between said cutter and said sharpening mechanism, and means for holding said cam mechanism in adjusted position while said cutting apparatus and sharpening mechanism continue in operation.

50. The combination with cutting apparatus comprising a cutter, of sharpening mechanism for said cutter and traveling therewith, rotary cam mechanism for establishing operative relation between said cutter and said sharpening mechanism at intervals, and means for rotating said cam mechanism at a slower rate of speed than the rate of travel of said cutter.

51. The combination with cutting apparatus comprising a supporting arm and a cutter pivoted thereto, of a grinding wheel, an auxiliary arm carrying said grinding wheel and pivoted to said cutter arm, cam mechanism for swinging said cutter into engagement with said grinding wheel at intervals, a spring acting on said auxiliary arm to hold said grinding wheel in yielding engagement with said cutter, and means for operating said grinding wheel to effect the sharpening of said cutter.

52. The combination with cutting apparatus comprising a cutter bar and a cutter pivotally connected to the outer end of said bar, sharpening mechanism for said cutter, and a cam for automatically moving said cutter into operative relation with said sharpening mechanism.

In testimony whereof I have signed my name to this specification, in the presence of two subscribing witnesses, on this 21st day of June A. D. 1910.

EDMUND C. MORGAN.

Witnesses:
CHARLES W. MILLER,
G. E. MCKINLEY.

Copies of this patent may be obtained for five cents each, by addressing the "Commissioner of Patents, Washington, D. C."